Patented Nov. 2, 1948

2,452,943

UNITED STATES PATENT OFFICE 2,452,943

CATALYZED SULFAMIC ACID SULFATION

John David Malkemus, Allendale, John Ross, Ramsay, and Dwight James Potter, Ridgewood, N. J., assignors to Colgate-Palmolive-Peet Company, Jersey City, N. J., a corporation of Delaware No Drawing. Application May 18, 1946, Serial No. 670,856

8 Claims. (Cl. 260—400)

This invention relates to methods for effecting the sulphation of monohydric and polyhydric alcohols and their derivatives, by the action of sulphamic acid. The invention relates particularly to the manufacture of sulphation products having detergent, wetting, dispersing, emulsifying and foaming properties.

It has been suggested heretofore that alcohols might be sulphated by reaction with sulphamic acid. However, the reaction is slow, requiring from about two to ten hours or more for completion. The use of various organic bases, such as pyridine, for example, is known to speed up the reaction to some extent and to have a solvent effect upon the reaction mass. However, when organic bases are present a reaction between the base and the sulphamic acid takes place relatively quickly so that much of the sulphamic acid is lost in side reactions which produce undesired products before the reaction between the alcohol and sulphamic acid is effected. For this reason the final reaction product must be carefully freed of the organic base as well as undesired side reaction products before it is suitable for most purposes. Furthermore, the presence of organic bases, such as pyridine, in the final product tends to darken the product and render it unstable. Products containing pyridine or the pyridine salts of sulphamic acid also have an unpleasant odor and are toxic and irritating to the skin, so that they cannot be employed for personal use or for many other washing, detergent and similar purposes.

In accordance with the present invention, these and other disadvantages and difficulties attendant upon prior methods of sulphating alcohols and their derivatives by the action of sulphamic acid are overcome and simple and economical processes provided whereby products having excellent wetting, detergent, emulsifying and foaming properties are obtained. The products are substantially neutral and stable. They are light in color, have no unpleasant odor, and are not toxic or irritating to the skin. Furthermore, the reaction by which the products are produced is readily carried out in a relatively short time, and substantially all of the sulphamic acid employed is utilized in forming the desired sulphated products.

The principal object of the present invention is to provide new and improved methods for effecting the sulphation of alcohols and their derivatives by the action of sulphamic acid.

Another object of the invention is to provide catalysts for accelerating the reactions between alcohols and their derivatives and sulphamic acid.

A further object of the invention is to increase the yield and improve the products obtained when reacting alcohols and their derivatives with sulphamic acid.

A particular object of the invention is to provide improved methods for producing sulphated products having wetting, detergent, emulsifying and foaming properties.

These and other objects and features of the invention will appear from the following description thereof in which reference is made to typical and preferred procedure and examples in order to indicate the nature of the invention and without intending to limit the scope of the invention thereby.

In carrying out reactions between sulphamic acid and alcohols and their derivatives, in accordance with the present invention, a catalyst is employed which consists of or contains an amide. These catalysts may be used by themselves or in combination with other materials, and excellent results have been obtained when using some of the reaction product previously produced. Thus the catalysts of the present invention include those materials which react with sulphamic acid to form an amide in situ, and also include the products of reaction between an amide and sulphamic acid.

Apparently any amide or substituted amide, or material containing one or more of such compounds, may be employed as catalyst herein; thus, acetamide, urea, thiourea, guanyl urea, phenylurea, benzamide, diacetamide, semicarbazide, ammonium sulphamate, dicyandiamide, malonamide, sulphamide, a sulphonamide such as benzene sulphonamide, and other amide-like compounds have been employed with success. Reaction products containing these amides have also been used. In fact, no amides employed have failed to promote the reaction, although all amides do not appear to be equally effective and certain catalysts produce better results with one alcohol or alcohol derivative than with another. The particular catalyst employed and the amount thereof selected for use in any particular reaction may therefore vary considerably within the scope of the invention, it being understood that an important desideratum is that the particular catalytic material employed shall be substantially odorless, non-toxic and essentially neutral in character.

Generally, it is found that the addition of from about 1% to 20% by weight of the catalyst, based on the weight of the sulphamic acid employed, gives excellent results. However, in some instances as much as 50% by weight of the catalyst may be used and there does not appear to be any upper limit in the amount of catalyst used.

The reaction between the sulphamic acid and the alcohol or alcohol derivative starts promptly and some sulphated product is generally produced within about five minutes, whereas the reaction is usually completed in from about fifteen minutes to two or three hours, depending upon the catalyst used, the alcohol or alcohol derivative employed, and other factors. The temperature at which the reaction is carried out is usually in the neighborhood of from 90° C. to 150° C. and preferably from about 100° C. to 130° C.

The alcohols used in carrying out the reaction may be any primary or secondary alcohol, such as aliphatic, alicyclic and aromatic monohydric and dihydric alcohols, glycols, glycerols, diglycerols and polyglycerols, and polyhydric alcohols in general, any alcohol or derivative of alcohol having at least one functional alcoholic-OH group remaining in the molecule being suitable for treatment in accordance with the present invention. The fatty acid hydroxy esters, the fatty acid hydroxy amides, and the simple fatty acid esters of polyhydric alcohols may also be used so long as at least one functional alcoholic-OH group is present in the molecule. Typical of these alcohols and alcohol derivatives are: lauryl alcohol, methyl undecyl carbinol, cyclohexanol, methyl ricinoleate, propylene glycol monoesters of capric, lauric, myristic, coconut and stearic acids, ethylene glycol monoesters of lauric, coconut and stearic acids, diethylene glycol monostearate, glycerine derivatives such as monolaurin, monoolein, dicaprylin and dilaurin. These and other alcohols and alcohol derivatives are herein referred to by the generic terms "alcohols" and "alcohol derivatives."

In carrying out the reaction, the amount of sulphamic acid employed is preferably substantially equal to or slightly in excess of the amount theoretically necessary to combine with the alcohol or alcohol derivative according to the general equation:

$$ROH + NH_2SO_3H \rightarrow ROSO_3NH_4$$

Any excess of sulphamic acid may be neutralized with ammonia gas or other alkaline material and allowed to remain in the final product. The products thus obtained may be dispersed in water or in water-alcohol mixtures, generally resulting in substantially clear solutions, and the pH of the resulting mixture thereafter adjusted to a value of between about 5 and 7, these products exhibiting useful properties as detergents, wetting agents, emulsifiers and foaming compositions.

In order to indicate the nature of the present invention more fully, the following examples of typical procedure are cited, but it should be understood that these examples are presented as illustrative only and are not intended to limit the scope of the invention.

Example I 105 parts of sulphamic acid are suspended in 267 parts of propylene glycol monoester of coconut fatty acids, and 10 parts of dicyandiamide are added. The mixture is heated in an atmosphere of carbon dioxide to a temperature of from about 115° C. to 125° C. with constant stirring. The reaction product, which soon begins to form, remains suspended in the liquid, and, as the reaction continues, a pasty, semi-solid mass is finally produced. However, the consistency of the mass is considerably more fluid when the catalyst is used than when omitted, and the formation of a homogeneous product is readily effected. The reaction is substantially completed in about eighty minutes, as indicated by titration of a sample of the product for free acid. The excess of sulphamic acid present in the mass is then neutralized by passing ammonia gas into the material, and there is obtained as a final product a cream-colored paste which may be dissolved in water to form a clear solution having a pH of 5.7 which foams well on agitation.

Example II 100 parts of sulphamic acid are agitated with 250 parts of coconut acid monoester of propylene glycol and 8 parts of acetamide at about 120° C. The reaction is completed in about thirty minutes, whereupon a product is obtained which is quite soluble in water and which foams very well when agitated.

Example III

A mixture of 110 parts sulphamic acid, 10 parts thiourea, and 180 parts lauryl alcohol was heated with stirring at about 100° C. for sixty minutes. The cream-colored product dissolved in water to give a practically clear solution which foamed well on agitation.

Example IV

A mixture of 358 parts of diethylene glycol monostearate, 110 parts sulphamic acid, and 10 parts ammonium sulphamate was heated with stirring at about 120° C. for two hours when the reaction was practically complete. The tan product dissolved in hot water to give an almost completely clear 1% solution which foamed well on agitation.

Example V

A mixture of 274 parts monolaurin, 150 parts sulphamic acid, 50 parts acetamide and 25 parts dicyandiamide was stirred at 115° C. After five minutes a portion of the pasty mixture dissolved in water to give a clear solution which foamed well.

Example VI

A mixture of 340 parts glyceryl dicaprylate, 50 parts acetamide, 25 parts dicyandiamide and 150 parts sulphamic acid was stirred at 115° C. for thirty minutes. An aqueous solution of the product foamed well when shaken and possessed excellent wetting properties.

Example VII

A mixture of 200 parts methyl undecyl carbinol, 110 parts sulphamic acid and 25 parts urea was stirred at 110° C. for thirty minutes. The light tan mass dissolved in water to give a clear solution which foamed well on shaking.

Example VIII 30 parts of the reaction product which resulted from heating 200 parts lauryl alcohol, 140 parts sulphamic acid and 30 parts urea with stirring for twenty minutes at about 120° C., was stirred at 120° C. with 200 parts lauryl alcohol and 130 parts sulphamic acid for twenty minutes. The product from this last reaction was soluble in water and the solution foamed well on agitation.

In each of the foregoing examples the product produced possesses useful surface active properties and may be employed as a detergent, wetting agent, foaming agent, emulsifier, or dispersing agent. These products may be used by themselves or with other detergents, fillers, and the like in the form of cakes, bars, beads, flakes, chips, pastes, or liquid. They are useful as shampoos, dental detergents and for washing or cleaning purposes. They may also be used in dyeing processes, as dispersing agents in oil and water paints, fungicides, and similar compositions. They are excellent emulsifiers for use in cosmetics, waxes, polishes and in ore flotation processes, and may be used as demulsifiers for water-in-oil petroleum emulsions. They are also useful in lubricants and may be employed as anti-splattering agents for cooking fats. Many other applications will occur to those skilled in the art.

In general, the products are light-colored, pasty compositions which are largely soluble in water. They are non-toxic and non-irritating to the skin, and do not have a pronounced odor.

While various specific examples of preferred compositions and methods embodying the present invention have been described above, it will be apparent that many changes and modifications may be made in the methods of procedure, and that a wide variety of specific catalysts, may be employed in carrying out the reactions. In view thereof, it should be understood that the examples cited and the particular proportions and methods of procedure set forth above are intended to be illustrative only, and are not intended to limit the scope of the invention.

We claim:

1. In the method of forming a sulphate wherein sulphamic acid is reacted with an organic compound consisting of C, H and O atoms and containing at least one functional group selected from the class consisting of ethers, carboxylic acid esters and alcohols, said organic compound containing at least one alcoholic-OH group capable of sulphation, there being present in the said organic compound no oxygen other than in the form of ethereal oxygen, carboxylic acid ester oxygen or alcoholic oxygen, the step that comprises carrying out the sulphation reaction in the presence of an amide as catalyst.

2. A method as in claim 1 wherein the catalyst is urea.

3. A method as in claim 1 wherein the catalyst is dicyandiamide.

4. A method as in claim 1 wherein the catalyst is acetamide.

5. A method as in claim 1 wherein the catalyst is employed in an amount varying from about 1 to 50% by weight, based on the weight of the sulphamic acid employed for sulphation.

6. A method as in claim 5 wherein the sulphation reaction is carried out at a temperature of about 90° to 150° C.

7. In the method of forming a sulphate wherein sulphamic acid is reacted with a monoester of a coconut fatty acid and a polyhydric alcohol, the step that comprises carrying out the sulphation reaction in the presence of an amide as catalyst.

8. In the method of forming a sulphate wherein sulphamic acid is reacted with lauryl alcohol, the step that comprises carrying out the sulphation reaction in the presence of an amide as catalyst.

JOHN DAVID MALKEMUS.
JOHN ROSS.
DWIGHT JAMES POTTER.

REFERENCES CITED

The following references are of record in the file of this patent:

UNITED STATES PATENTS

| Number | Name | Date |
|---|---|---|
| 2,147,785 | Cupery et al. | Feb. 21, 1939 |

FOREIGN PATENTS

| Number | Country | Date |
|---|---|---|
| 382,942 | Great Britain | 1932 |